US012771085B2

(12) United States Patent
Simonin et al.

(10) Patent No.: US 12,771,085 B2
(45) Date of Patent: Oct. 20, 2026

(54) GROUNDING BRUSH ASSEMBLY

(71) Applicant: AKTIEBOLAGET SKF, Gothenburg (SE)

(72) Inventors: Anthony Simonin, Tours (FR); Emmanuel Benevise, Monts (FR); Thomas Perrotin, Saint Roch (FR)

(73) Assignee: AKTIEBOLAGET SKF, Gothenburg (SE)

( * ) Notice: Subject to any disclaimer, the term of this patent is extended or adjusted under 35 U.S.C. 154(b) by 139 days.

(21) Appl. No.: 18/742,528

(22) Filed: Jun. 13, 2024

(65) Prior Publication Data

US 2025/0007226 A1 Jan. 2, 2025

(30) Foreign Application Priority Data

Jun. 30, 2023 (FR) ........................................ 2306925

(51) Int. Cl.

| | |
|---|---|
| ***H01R 39/39*** | (2006.01) |
| ***H01R 39/38*** | (2006.01) |
| ***H02K 5/14*** | (2006.01) |
| ***H02K 11/40*** | (2016.01) |

(52) U.S. Cl.

CPC ........... *H01R 39/39* (2013.01); *H01R 39/385* (2013.01)

(58) Field of Classification Search

CPC .......... H02K 5/14; H02K 11/40; H01R 39/39; F16C 41/002

USPC ........................................................... 310/239

See application file for complete search history.

(56) References Cited

U.S. PATENT DOCUMENTS

| | | | | |
|---|---|---|---|---|
| 8,199,453 | B2 | 6/2012 | Oh et al. | |
| 2021/0021180 | A1* | 1/2021 | Hubert | F16C 41/002 |
| 2021/0088076 | A1* | 3/2021 | Knoblauch | F16C 19/52 |
| 2021/0364040 | A1 | 11/2021 | Arnault et al. | |
| 2021/0364041 | A1 | 11/2021 | Berruet et al. | |
| 2022/0294319 | A1* | 9/2022 | Arnault | H02K 13/003 |
| 2022/0329127 | A1 | 10/2022 | Hubert et al. | |

(Continued)

FOREIGN PATENT DOCUMENTS

| | | | |
|---|---|---|---|
| DE | 102019133884 | A1 | 6/2021 |
| DE | 102021205176 | A1 | 11/2021 |
| DE | 102021205177 | A1 | 11/2021 |

(Continued)

OTHER PUBLICATIONS

Preliminary Search Report from the French Patent Office dated Jan. 22, 2024 in related French application No. FR2306925, including Search Report and Written Opinion.

*Primary Examiner* — Jose A Gonzalez Quinones

(74) *Attorney, Agent, or Firm* — J-TEK LAW PLLC; Scott T. Wakeman; Mark A. Ussai

(57) ABSTRACT

A grounding brush assembly includes a brush and a mounting plate, the brush including a support and a plurality of conductive fibers disposed within the support. The support includes a mounting portion and first and second lateral rims axially gripping the conductive fibers. At least one through opening is formed in the thickness of the mounting plate and the support further includes at least one tab extending through the at least one opening and having a bent free end. The bent free end interacts with the mounting plate so as to axially retain the support with respect to the mounting plate, the bent free end being located axially on the side of the mounting plate opposite to the support relative to the mounting plate.

9 Claims, 7 Drawing Sheets

(56) References Cited

U.S. PATENT DOCUMENTS

| | | | |
|---|---|---|---|
| 2023/0170658 | A1 | 6/2023 | Viault |

FOREIGN PATENT DOCUMENTS

| | | | |
|---|---|---|---|
| DE | 102021213639 | A1 | 6/2023 |
| JP | 2015095440 | A | 5/2015 |

* cited by examiner

GROUNDING BRUSH ASSEMBLY

CROSS-REFERENCE

This application claims priority to French patent application no. 2306925 filed on Jun. 30, 2023, the contents of which are fully incorporated herein by reference.

BACKGROUND OF THE INVENTION

The present invention relates to the field of grounding devices for controlling shaft voltage generated in electric motors or machines, and in particular grounding brush assemblies.

In an electric motor or machine, at least one rolling bearing is mounted between a casing of the electric motor or machine and a rotary shaft in order to rotatably support the shaft.

In operation, during rotation of the shaft, there may be a difference in electrical potential between the shaft and the casing of the electric motor or machine, which generates an electric current between the inner ring of the rolling bearing, rigidly secured to the shaft, and the outer ring, which is rigidly secured to the casing.

Electrical current passing through the components of the rolling bearing can damage these components, in particular the rolling elements and the raceways formed on the inner and outer rings. Electrical discharges can also generate vibration.

To overcome these drawbacks, it is a known practice to ground or earth the rotary shaft using a grounding brush comprising conductive fibers. The grounding brush is usually mounted in the bore of the casing of the electric motor such that the free ends of the fibers are in radial contact with the outer surface of the rotary shaft.

Due to the conductivity of the fibers, the brush is maintained at the same electrical potential as the casing of the electric motor. The inner and outer rings of the rolling bearing are also at the same electrical potential, which reduces, or even eliminates, problematic electrical discharges through the rolling bearing.

US Patent Publication No. 2021/0021180 A1 discloses a grounding brush assembly comprising a grounding brush provided with a support and a plurality of conductive fibers mounted in this support, and an annular mounting plate provided with a plurality of tabs for radial and axial retention of the support of the grounding brush, and an annular outer flange radially surrounding the brush and the tabs. The tabs are formed by plastic deformation of the mounting plate.

SUMMARY OF THE INVENTION

The present invention aims to provide an alternative attachment mechanism or structure for attaching a grounding brush to a mounting plate.

The invention relates to a grounding brush assembly comprising a grounding brush and a brush mounting plate, the brush being provided with a plurality of conductive fibers and with a support inside which the conductive fibers are housed.

The support comprises a mounting portion, a first lateral rim extending the mounting portion on one side, and a second lateral rim extending the mounting portion on the other side, the first and second lateral rims axially gripping the conductive fibers.

According to a general feature, at least one through opening is formed in the thickness of the mounting plate and the support of the brush includes at least one tab extending through the opening. The tab has a bent free end able to interact with the mounting plate so as to axially retain the support of the brush with respect to the mounting plate, the bent free end being located axially on the side opposite the support relative to the mounting plate.

Thus, the brush and the mounting plate are rigidly secured together axially, simply and inexpensively by virtue of the tab or tabs of the support of the brush.

The mounting plate may be provided with a main body.

The mounting plate may be provided with at least one centering portion extending the main body at least axially, which is offset radially outwards with respect to the support and has an outer surface defining the outside diameter of the mounting plate.

The through opening may be formed in the thickness of the main body of the mounting plate.

The tab may be able to interact with the main body of the mounting plate.

The tab of the support of the brush may extend from the mounting portion of the support of the brush.

The tab may be produced by partially cutting the support of the brush.

The first lateral rim of the support may be in axial contact with the mounting plate.

According to a particular design, a plurality of through openings is formed in the thickness of the mounting plate, the openings being offset from one another in the circumferential direction, the support of the brush comprising a plurality of tabs, each tab of the support of the brush extending through one of the openings, each tab being provided with a bent free end able to interact with the mounting plate so as to axially retain the support of the brush with respect to the mounting plate, the bent free ends being located axially on the side opposite the support of the brush relative to the mounting plate.

The present invention also relates to an electric motor comprising a casing, a shaft and a grounding brush assembly as defined above and mounted radially between the casing and the shaft, the conductive fibers of the assembly being in contact with the shaft, the mounting plate being in radial contact with the bore of the casing.

The invention also relates to a method for assembling a grounding brush assembly as defined above comprising the following steps:

- a positioning step in which the grounding brush is brought axially against the mounting plate and the tab is inserted axially through the opening such that the free end of the tab is located axially on the side opposite the support relative to the mounting plate; and
- an assembly step in which the free end of the tab of the support of the brush is bent.

The method may also comprise a prior step of partially cutting the first lateral rim of the support of the brush so as to form the tab.

BRIEF DESCRIPTION OF THE SEVERAL VIEWS OF THE DRAWINGS

The present invention will be understood more clearly on reading the detailed description of embodiments, provided by way of non-limiting examples and illustrated by the attached drawings in which.

DETAILED DESCRIPTION OF THE INVENTION

Figure 1:
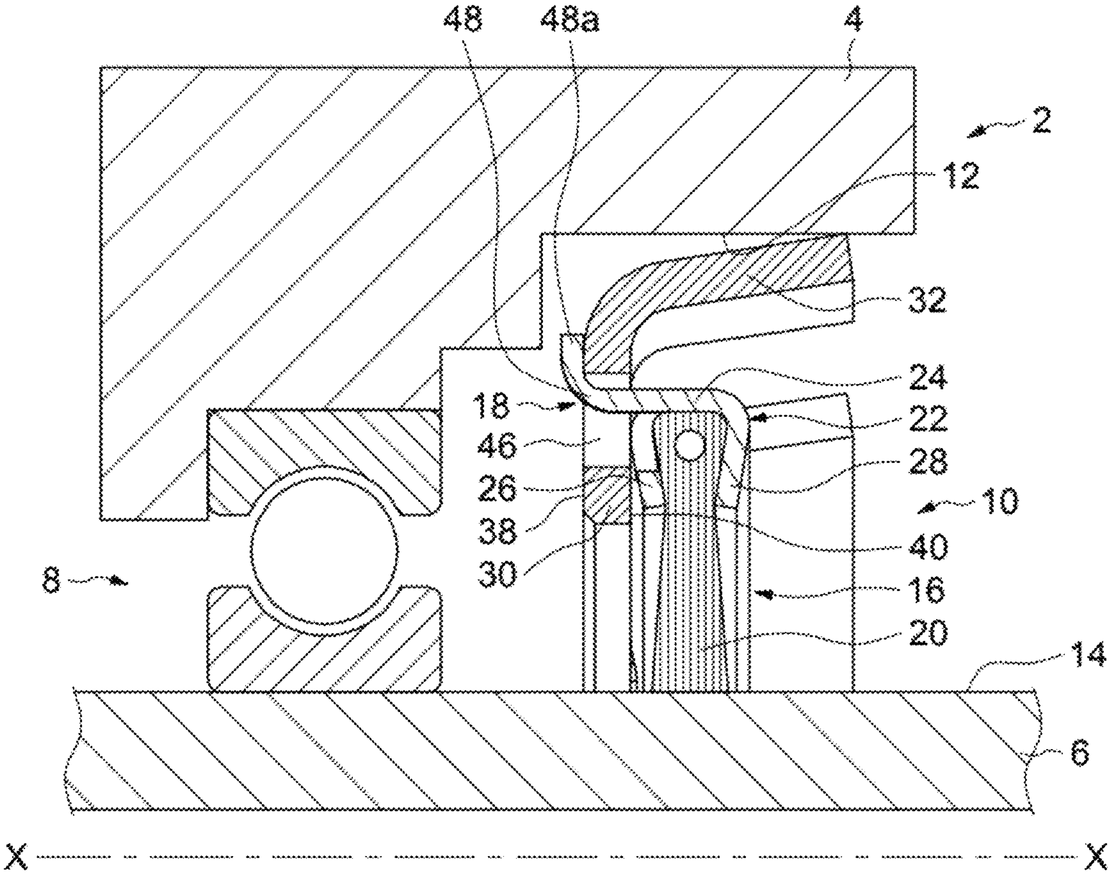
FIG. 1 is a view in axial cross section of a grounding brush assembly mounted radially between a rotary shaft and a casing of an electric motor according to an exemplary embodiment of the invention.

FIG. 1 shows, in axial cross section, a part of an electric motor or machine 2 comprising a fixed casing 4, a shaft 6 rotatable about a central axis X-X, and a bearing 8 radially supporting the shaft 6 within the casing 4. The bearing 8 is, for example, a rolling bearing such as a ball bearing. Alternatively, the bearing 8 may include any other appropriate rolling elements, such as cylindrical rollers, tapered rollers, needles, etc. or the bearing 8 may be formed as a plain bearing.

The motor 2 further comprises a grounding brush assembly 10 mounted radially between the bore 12 of the casing 4 and the cylindrical outer surface 14 of the shaft 6. The assembly 10 is, for example, force-fitted in the bore of the casing 12.

Figure 2:
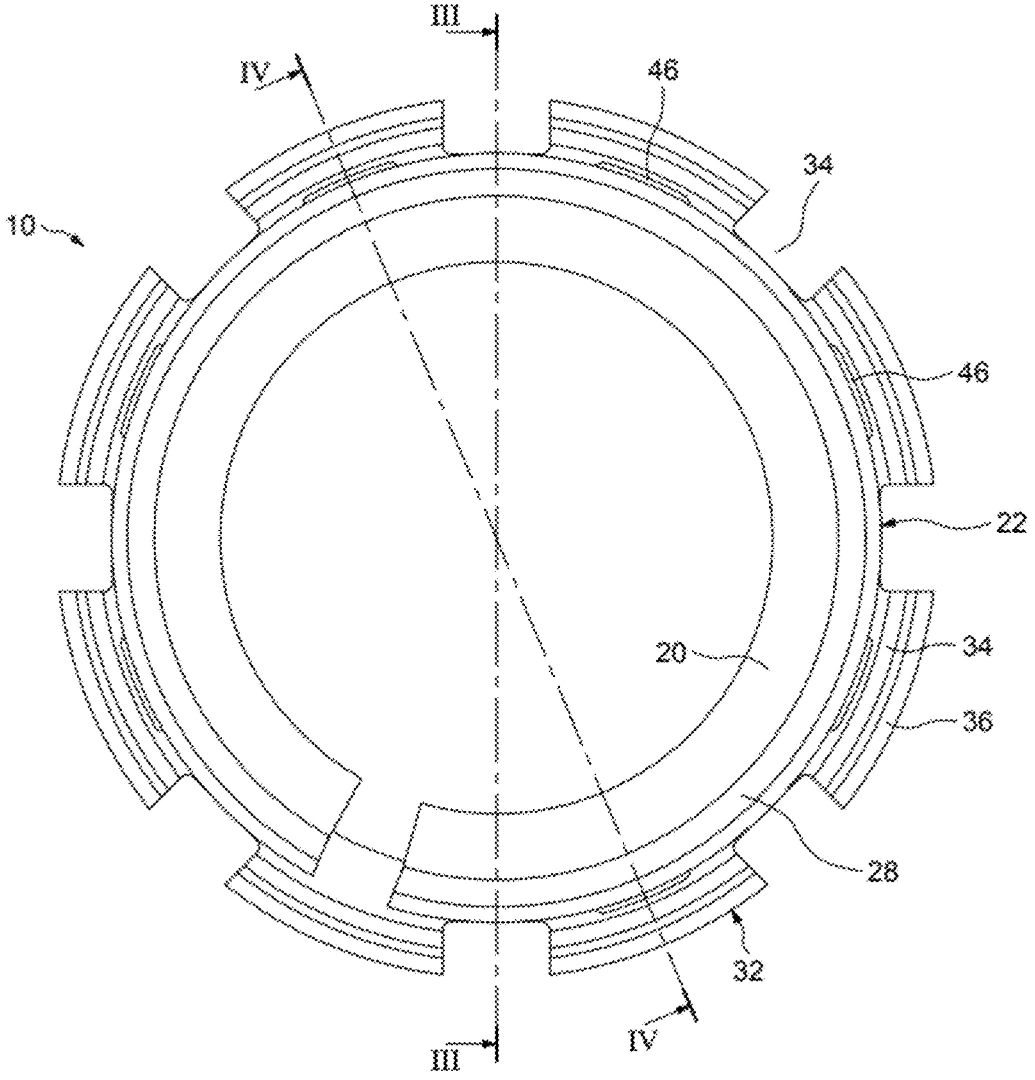
FIG. 2 is an end-on view of the grounding brush assembly of FIG. 1.
Figure 3:
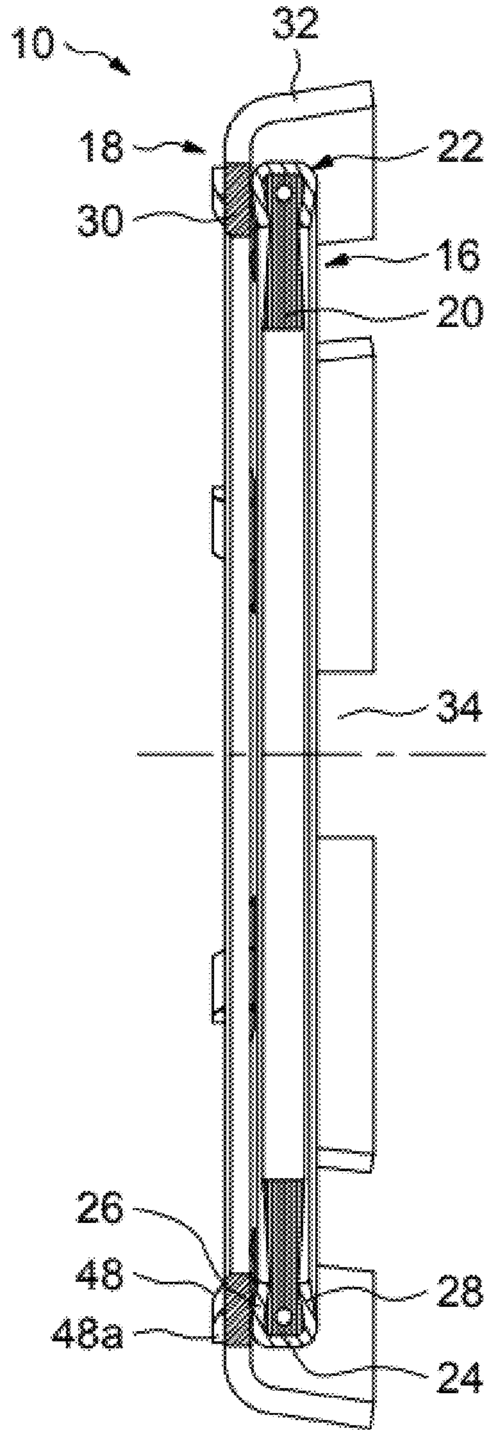
FIG. 3 is a view in cross section of the assembly of FIG. 2 along the axis III-III.
Figure 4:
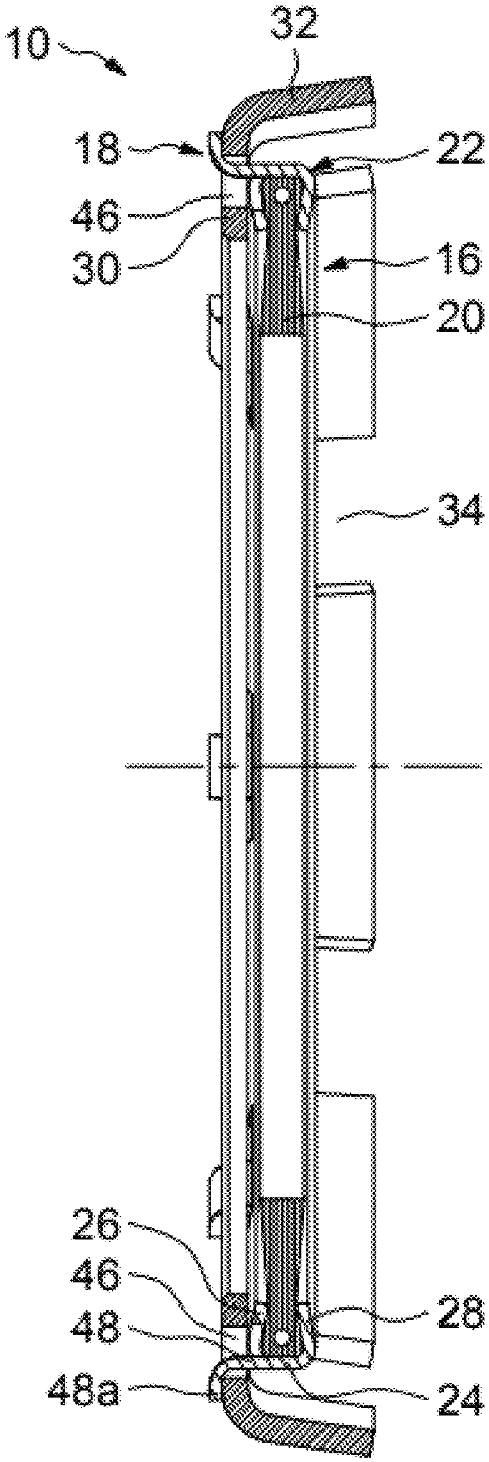
FIG. 4 is a view in cross section of the assembly of FIG. 2 along the axis IV-IV.

As shown more clearly in FIGS. 2 to 4, the assembly 10 has a generally annular shape and basically comprises a grounding brush 16 and a brush mounting plate 18. The brush 16 includes a plurality of conductive fibers 20 and a support 22, the conductive fibers 20 being housed inside or disposed within the support 22 of the brush 16. The conductive fibers 20 are made of an appropriate conductive material, for example, carbon, stainless steel, a conductive plastic such as acrylic or nylon fibers, etc. The plurality of conductive fibers 20 are generally formed as an open ring. In the depicted example, the conductive fibers 20 are bent around a connecting wire (not indicated). The free distal end of each of the conductive fibers 20 is in radial contact with the cylindrical outer surface 14 of the shaft 6.

To ensure the mounting and retention of the conductive fibers 20, the support 22 of the brush 16 comprises a mounting portion 24, a first lateral rim 26 extending from one axial side of the mounting portion 24 and a second lateral rim 28 extending from an opposing axial side of the mounting portion 24. The mounting portion 24 extends from the large-diameter edge of the first lateral rim 26. The first lateral rim 26 extends radially inwardly from the mounting portion 24.

Similarly, the mounting portion 24 extends from the large-diameter edge of the second lateral rim 28. The second lateral rim 28 extends radially inwardly from the mounting portion 24. The second lateral rim 28 extends from the mounting portion 24 on the axial side opposite to the first lateral rim 26.

The mounting portion 24 in the depicted example extends substantially axially. Alternatively, the mounting portion 24 may extend obliquely.

The mounting portion 24 and the first and second lateral rims 26, 28 are each formed of generally annular shape and delimit a channel that is open radially inwardly, inside of which an outer end of each of the conductive fibers 20 is located. The first and second lateral rims 26, 28 axially grip the conductive fibers 20, such that the conductive fibers 20 bear axially on either side against the first and second lateral rims 26, 28.

In the depicted exemplary embodiment, the conductive fibers 20 come to bear radially against the mounting portion 24, the first and second lateral rims 26, 28 extending obliquely inwardly from the mounting portion 24 so as to be generally converging. Alternatively, the first and second lateral rims 26, 28 may extend substantially radially.

As described in greater detail below, the support 22 of the brush 16 further includes a plurality of retention tabs 48 for axially rigidly securing the support 12 with respect to the mounting plate 18.

The mounting plate 18 includes a main body 30, the main body 30 being of generally annular shape and bearing axially against the first lateral rim 26 of the support 22 of the brush 16, and a plurality of centering portions 32 extending obliquely outwardly from a large-diameter edge of the main body 30. The centering portions 32 of the mounting plate 18 are spaced apart from one another in the circumferential direction of the assembly 10, such that a plurality of notches 34 are each defined circumferentially between each two consecutive centering portions 32. The centering portions 32 may be formed, for example, by cutting an annular portion to form the notches 34, such as by means of a stamping operation.

The centering portions 32 collectively define an outside diameter of the mounting plate 18. Specifically, the outer surfaces (not indicated) of the centering portions 32 define the outside diameter of the mounting plate 18. The centering portions 32 enable centering of the mounting plate 18 after mounting the grounding brush assembly 10 within the bore 12 of the casing 4 of the associated electric motor 2.

As depicted, each centering portion 32 extends obliquely outwardly and at least locally surrounds and is spaced radially outwardly from the mounting portion 24 of the support 12 of the brush 16. Alternatively, each centering portion 32 may extend entirely axially and/or may extend at least axially in a direction opposite to the mounting portion 24 of the support 22 of the brush 16.

The mounting plate 18 and the support 22 of the brush 16 are formed as two separate parts. The mounting plate 18 and the grounding brush 16 are each formed of an electrically conductive material, for example aluminum, stainless steel, bronze, copper or another appropriate material.

The main body 30 of the mounting plate 18 has two opposite end faces 38, 40 which delimit an axial thickness (not indicated) of the main body 30 of the mounting plate 18. The first lateral rim 26 of the support 22 of the brush 16 bears axially against the end face 40 of the main body 30.

A plurality of through openings 46 are each formed in the thickness of the mounting plate 18. More specifically, each opening 46 is formed in the axial thickness of the main body 30 of the mounting plate 18 so as to extend between the end face 38 and the end face 40. The openings 46 open on the end faces 38, 40. The openings 46 are located radially at a distance from a bore (not indicated) of the main body 30. Preferably, the openings 46 are identical to one another.

As depicted, the openings 46 extend substantially axially, but the openings 46 may alternatively extend obliquely. The openings 46 are offset from each other in the circumferential direction of the assembly 10, in this case regularly or evenly. In the depicted exemplary embodiment, there are eight openings 46. Alternatively, the plate main body 30 may include a different number of openings 46, for example more than eight or fewer than eight or any other desired number of openings 46.

As stated above, the support 22 of the brush 16 includes a plurality of retention tabs 48 for axially rigidly securing the support 22 with respect to the mounting plate 18. The tabs 48 are preferably substantially identical to each other.

Specifically, each tab 48 extends axially from the mounting portion 24 of the support 22 of the brush 16 in a direction opposite to the second lateral rim 28 of the support 22 of the brush 16. Each tab 48 axially extends through one of the openings 46 formed in the thickness of the mounting plate 18.

Each tab 48 of the support 22 of the brush 16 has a free end **48*a* located axially on the side opposite the support 22 of the brush 16 relative to the mounting plate 18 and is bent so as to protrude radially with respect to the main body 30 of the mounting plate 18. The bent free end 48*a* of each tab 48 interacts by axial contact with the mounting plate 18 so as to axially retain the support 22 of the brush 16 with respect to the mounting plate 18. The bent free end 48*a* of each tab 48 interacts by axial contact with the end face 38 of the mounting plate 18**.

In the example shown, each bent free end **48*a* of the tabs 48 extends radially outwardly, being in axial contact with the end face 38 of the main body 30 of the mounting plate 18. Alternatively, all or some of the bent free ends of the tabs 48 may extend radially inwardly and/or be located at an axial distance from the end face 38 of the main body 30 of the mounting plate 18. As a further alternative, the bent free ends 48*a* of the tabs 48** may extend obliquely.

In the exemplary embodiment, the tabs 48 extend from the mounting portion 24 of the support 22 of the brush 16. Alternatively, the tabs 48 could extend from the rounded portion (not indicated) connecting the mounting portion 24 of the support 22 to the first lateral rim 26. In another variant, the tabs 48 may extend from the first lateral rim 26 of the support 22.

In the depicted exemplary embodiment, the support 22 of the brush 16 is made in one piece. Alternatively, the tabs 48 could be formed separately from and attached to the support 22 by any appropriate means, for example by welding or adhesive bonding.

In the example shown, the second lateral rim 28, the mounting portion 24 and the first lateral rim 26 are in the form of an open ring and extend circumferentially or angularly over an angular sector of greater than 300°, in particular over an angular sector of greater than 350°.

In the example shown, the support 22 of the brush 16 includes a plurality of retention tabs 48. Alternatively, the support 22 of the brush 16 may include only a single retention tab 48 and the mounting plate 18 may then have only a single through opening 46.

In the exemplary embodiment, the mounting plate 18 includes a plurality of centering portions 32 spaced apart regularly or evenly in the circumferential direction of the assembly 10. In a variant, the mounting plate 18 may include a plurality of centering portions 32 spaced apart irregularly or unevenly in the circumferential direction of the assembly 10.

In another variant, the mounting plate 18 may include only a single annular centering portion 32 forming a flange.

Figure 5:
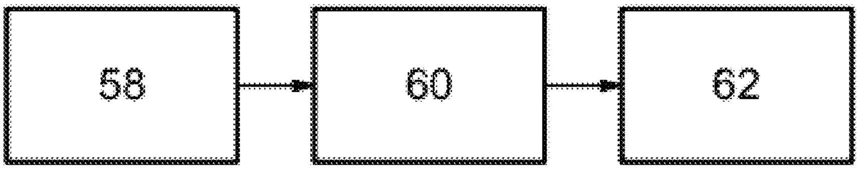
FIG. 5 schematically depicts a method for assembling a grounding brush assembly according to the invention.

FIG. 5 schematically depicts a method for assembling the assembly 10. The method begins with a step of partially cutting 58 the first lateral rim 26 of the support 22 of the brush 16 so as to form the tabs 48.

Next is a positioning step 60, during which the support 22 of the brush 16 is brought or positioned axially against the mounting plate 18 such that the first lateral rim 26 of the support 22 of the brush 16 bears axially against the main body 30 of the mounting plate 18.

Figure 6:
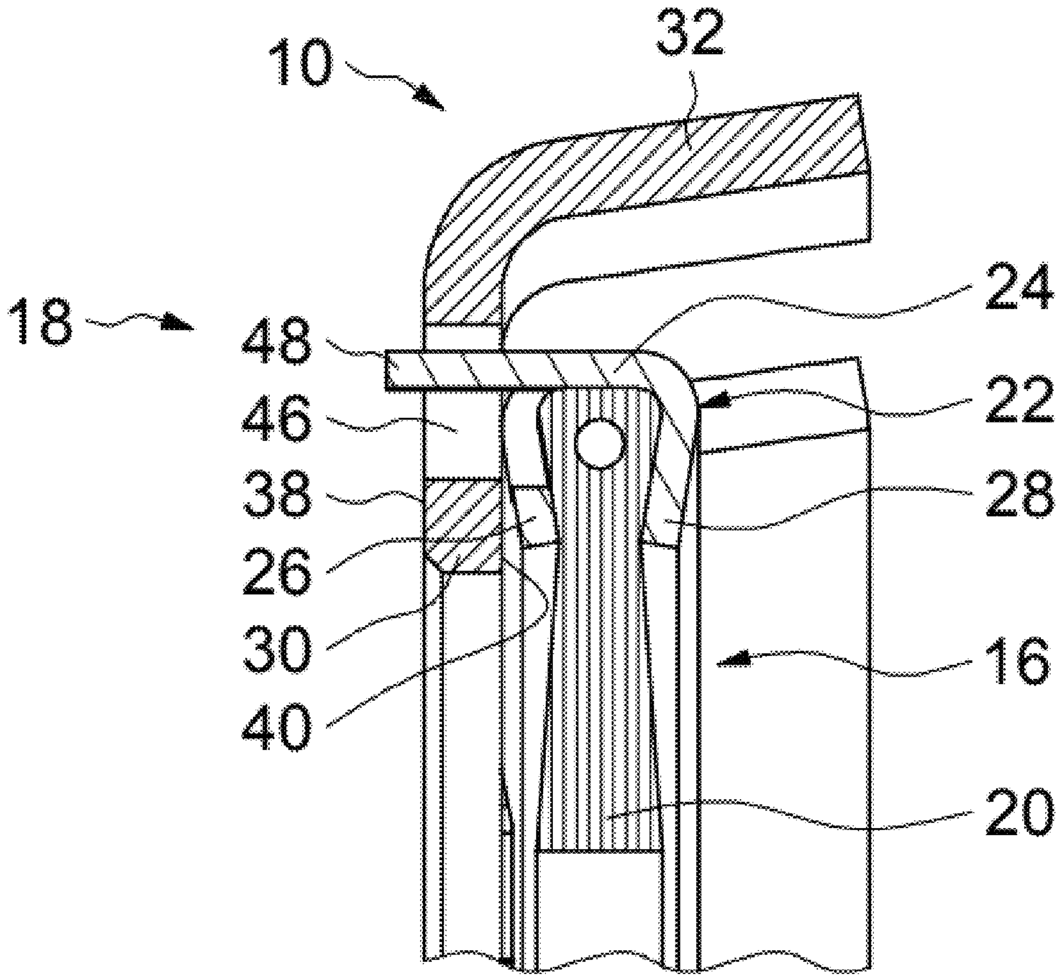
FIG. 6 depicts a positioning step of the method of FIG. 5.

During this step, each tab 48 of the support 22 of the brush 16 is inserted, also axially, through one of the openings 46 formed in the thickness of the mounting plate 18, such that the free end **48*a* of each tab 48 of the support 22 of the brush 16 is located axially on the side of the plate 18 opposite to the support 22 of the brush 16 relative to the mounting plate 18 and protrudes from the plate 18. This step is shown in FIG. 6**.

Figure 7:
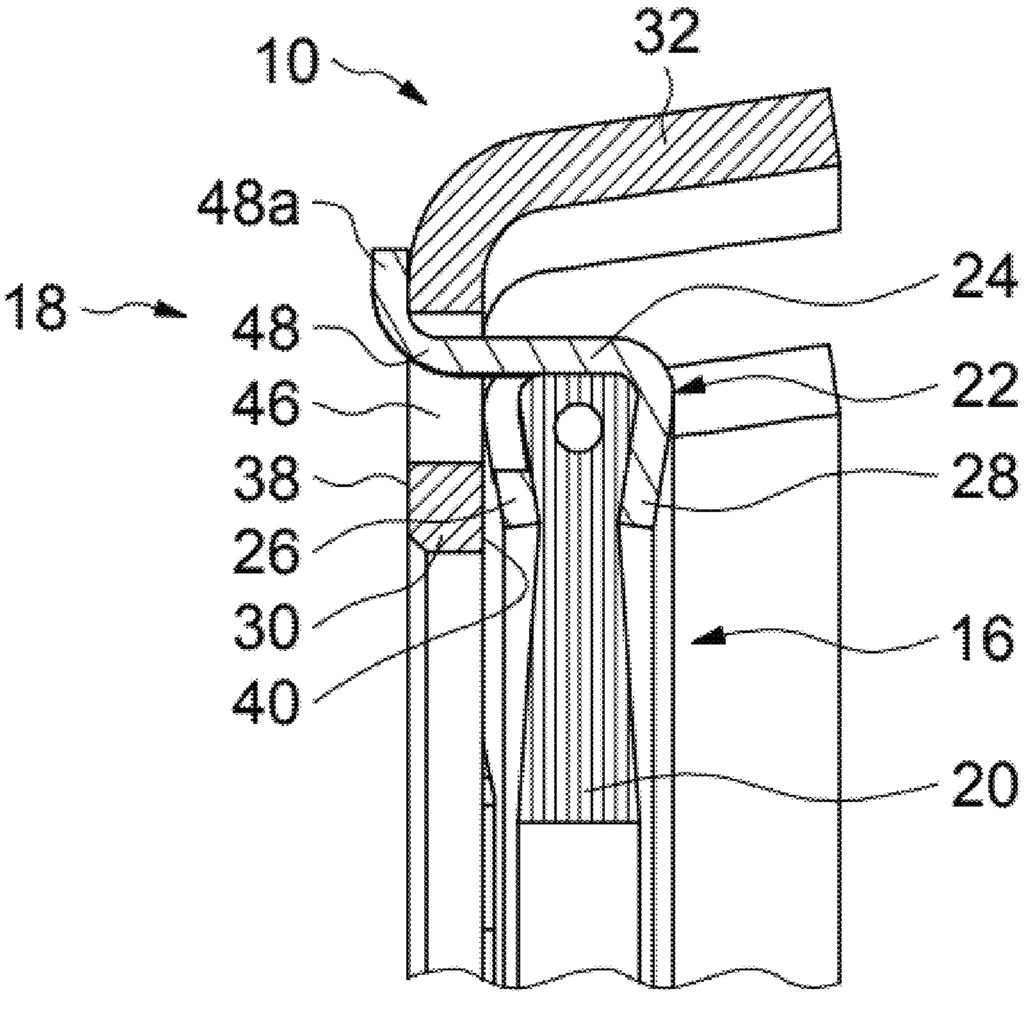
FIG. 7 depicts an assembly step of the method of FIG. 5.

Then an assembly step 62 is performed during which the free end **48*a* of each tab 48 of the support 22 of the brush 16 is bent radially outwardly and against the mounting plate 18. This step is shown in FIG. 7. The brush 16 and the mounting plate 18** are thereby rigidly secured together axially.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:

a grounding brush including a support and a plurality of conductive fibers disposed at least partially within the support, the support having a mounting portion, a first lateral rim extending from one axial side of the mounting portion and a second lateral rim extending from another axial side of the mounting portion, the first and second lateral rims axially gripping the conductive fibers; and a brush mounting plate having an axial thickness and at least one through opening extending through the thickness of the mounting plate;

wherein the support of the brush further includes at least one tab extending through the at least one through opening of the mounting plate, the at least one tab having a bent free end interacting with the mounting plate so as to axially retain the support of the brush with respect to the mounting plate, the bent free end being located axially on a side of the mounting plate opposite to the support with respect to the mounting plate.

2. The grounding brush assembly according to claim 1, wherein the mounting plate includes a main body and at least one centering portion extending at least axially from the main body, the at least one centering portion being offset radially outwardly with respect to the support and having an outer surface defining an outside diameter of the mounting plate, the through opening being formed in a thickness of the main body and the tab interacting with the main body of the mounting plate.

3. The grounding brush assembly according to claim 1, wherein the at least one tab of the support of the brush extends from the mounting portion of the support of the brush.

4. The grounding brush assembly according to claim 1, wherein the at least one tab is formed by partially cutting the support of the brush.

5. The grounding brush assembly according to claim 1, wherein the first lateral rim of the support is in axial contact with the mounting plate.

6. The grounding brush assembly according to claim 1, wherein:

the at least one through opening of the mounting plate includes a plurality of through openings formed in the thickness of the mounting plate, the plurality of openings being circumferentially offset from each other about the mounting plate; and the at least one tab of the support of the brush includes a plurality of tabs, each one of the plurality of tabs extending through a separate one of the plurality of through openings of the mounting plate, each one of the plurality of tabs having a bent free end interacting with the mounting plate so as to axially retain the support of the brush with respect to the mounting plate, the bent free ends of the plurality of tabs being located axially on the side of the mounting plate opposite to the support of the brush with respect to the mounting plate.

7. An electric motor comprising:

a casing with a bore;

a shaft; and a grounding brush assembly according to claim 1 mounted radially between the casing and the shaft, the conductive fibers of the grounding brush assembly being in contact with the shaft and the mounting plate being in radial contact with the bore of the casing.

8. A method for assembling a grounding brush assembly according to claim 1, comprising the steps of:

a positioning step in which the grounding brush is brought axially against the mounting plate and the at least one tab of the support of the brush is inserted axially through the through opening of the mounting plate such that the free end of the at least one tab is located axially on the side opposite the support with respect to the mounting plate; and an assembly step in which the free end of the at least one tab of the support of the brush is bent.

9. The method according to claim 8, further comprising a step of partially cutting the first lateral rim of the support of the brush so as to form the at least one tab of the support of the brush.

* * * * *